United States Patent [19]

Lakshmanan et al.

[11] 4,359,556

[45] Nov. 16, 1982

[54] THERMOPLASTIC POLYAMIDE HOT MELT ADHESIVE COMPOSITION

[75] Inventors: Pallavoor R. Lakshmanan, Houston, Tex.; Benedict J. Monachino, Chatham, N.J.

[73] Assignee: Gulf Oil Corporation, Pittsburgh, Pa.

[21] Appl. No.: 271,741

[22] Filed: Jun. 5, 1981

[51] Int. Cl.³ ............................................. C08L 77/00
[52] U.S. Cl. .................................. 525/420.5; 525/426
[58] Field of Search ........................... 525/426, 420.5; 260/18 N

[56] References Cited

U.S. PATENT DOCUMENTS

| | | | |
|---|---|---|---|
| 2,638,449 | 5/1953 | White | 260/18 N |
| 3,375,300 | 3/1968 | Ropp | 260/18 N |
| 3,484,403 | 12/1969 | Brunson | 525/184 |
| 4,158,664 | 6/1979 | Selwitz | 562/595 |

FOREIGN PATENT DOCUMENTS 2061981  5/1981  United Kingdom ............... 525/426

*Primary Examiner*—Paul Lieberman
*Attorney, Agent, or Firm*—Richard L. Kelly

[57] ABSTRACT

Hot melt adhesive compositions are provided which contain 40–98 weight % of a thermoplastic polyamide resin derived from a dimer acid and a low molecular weight aliphatic diamine, and 2–60 weight % of an alkenyl succinic anhydride.

5 Claims, No Drawings

THERMOPLASTIC POLYAMIDE HOT MELT ADHESIVE COMPOSITION

BACKGROUND OF THE INVENTION

Thermoplastic polyamides derived from dicarboxylic acids such as dimer acid and various aliphatic diamines are used extensively as hot melt adhesives, particularly for applications which require good adhesion and high tensile strength of adhesive bonds. The adhesive thermoplastic polyamides are sold commercially in three general molecular weight classes. The lowest molecular weight materials can be applied using simple inexpensive equipment. For the intermediate molecular weight materials, application equipment ranges from simple to moderately sophisticated, because of the necessity of dealing with problems caused by higher melt viscosities and the undesirable effects of high melt temperatures. The highest molecular weight materials are very desirable as high strength adhesives, but their high melt viscosities make necessary the use of very sophisticated application equipment.

SUMMARY OF THE INVENTION

The applicants have discovered polyamide hot melt adhesive compositions which possess reduced melt viscosities, combined with good bonding of various types of substrates, so that they may be applied at lower temperatures, with simple equipment. The new compositions contain two essential components, thermoplastic polyamide and an alkenyl succinic anhydride.

DETAILED DESCRIPTION OF THE INVENTION

The compositions of the invention contain about 2 to 60 weight percent, preferably 5–50 weight percent, and most preferably about 12.5–25 weight percent of the alkenyl succinic anhydride, in combination with 40 to 98 weight percent of a thermoplastic polyamide derived from dimer acid and a low molecular weight aliphatic diamine. For the most advantageous results, intermediate and higher molecular weight polyamides are preferred, so as to obtain the desirable high strength adhesive bonding properties of these resins without the use of highly sophisticated application equipment.

Optionally, the compositions may contain as much as 10 weight percent or more of additional components as, for instance, tackifiers, plasticizers, pigments, solid reinforcing fillers, antioxidants and stabilizers consistent with the high strength performance that is generally expected of this class of adhesives. Suitable tackifiers include terpene resins, rosin, rosin esters, metal rosinates, and terpene-phenolic resins. Specific examples of such tackifiers are set forth in the October 1971 CA Report No. 37 published by the Technical Association of the Pulp and Paper Industry, which descriptions are incorporated herein by reference.

The thermoplastic polyamide resins are prepared from (1) the so-called dimer acids which contain about 36 carbon atoms and which are prepared by dimerizing an unsaturated aliphatic monocarboxylic acid such as oleic, linolenic, or linoleic acid, and (2) a low molecular weight aliphatic amine containing two terminal —NH$_2$ groups such as ethylenediamine or hexamethylenediamine. The resins typically have a molecular weight in the range of about 2,000 to 20,000 and Ring and Ball softening points in the range of about 85° C. to about 200° C. Certain of these resins are commercial products sold under the trade designations Versamid (low molecular weight), Versalon (intermediate molecular weight), and Milvex (high molecular weight).

The alkenyl succinic anhydrides employed in the compositions of the invention are known compounds of the type described in U.S. Pat. No. 4,158,664, whose descriptions are incorporated herein by reference. These compounds are prepared by heating a high molecular weight alpha-olefin containing about 18 or more carbon atoms with maleic anhydride. Their structure is shown below:

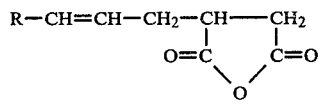

In the above formula, R is an alkyl group containing at least 15 carbon atoms. Frequently these compounds are prepared from a mixture of alpha-olefins in which each component contains a minimum of about 18 carbon atoms. In this event, R can be expressed as an average value which seldom will be in excess of 49. Preferably R will have an average value of less than 39.

It is known to blend minor amounts of other substances with polyamide hot melt adhesives so as to improve adhesion to certain specific substrates, usually with concomitant reduction of adhesion to certain other substrates. Maleic anhydride-modified polyethylene, for example, has been melt-blended with a thermoplastic polyamide to obtain good flexibility, elongation at break, and adhesion to various substrates, as exemplified in U.S. Pat. No. 3,484,403. The commercial maleic anhydride modified polyethylene, Epolene C-16 may be manufactured according to the method of Example 1 of the aforementioned patent. Compositions which employ this product have been compared with the applicants' compositions and the results of these comparisons are presented in tabulated form in the discussion which follows. The maleated polyethylene does not produce the unexpected decrease in melt viscosity which characterizes the effect of addition of the alkenyl succinic anhydrides. Other differences in behavior are also apparent upon examination of the tabulated data.

The compositions of the invention are solids at room temperature, but have melting points and melt viscosities in a range such that they can be readily applied to appropriate substrates using conventionally employed hot melt techniques and equipment. The compositions, depending upon their precise formulation, have ring and ball softening points within a range of approximately 80° to 165° C. The compositions can be formulated to have viscosities, at 400° F. (204° C.) from as low as about 30 cps to as high as 28,000 cps or more.

A suitable procedure for preparing the hot melt adhesive compositions involves placing the alkenyl succinic anhydride in a jacketed mixing kettle (or in a jacketed heavy duty mixer of the Baker-Perkins or Day type for compositions having high viscosities) equipped with a stirrer and thereupon raising the temperature to a range of from about 250° to 400° F., (121° to 204° C.) and preferably 300° to 350° F. (149° to 177° C.) When the initially charged components have melted, stirring is initiated and the polyamide then is added. Stirring and heating are continued during the addition and until a smooth, homogeneous mass is obtained. The resulting hot melt adhesive composition is drawn off and may be used immediately in hot pots; or, it may be melt-extruded into rope form or converted into pellets, rods, cylinders, slugs, or billets depending on the equipment which will be subsequently used to apply the hot melt; or, it may be placed in cooling pans and held in bulk form for later use; or it may be granulated or diced.

The hot melt adhesive compositions of the invention give very satisfactory results in preparing laminated structures from laminae prepared from polar resins such as polyamides, acrylonitrile-butadiene-styrene resins, metals and wood. The procedural steps for bonding the laminae together are those commonly employed with other hot melt adhesives. The hot melt adhesive is applied to at least one of the surfaces to be bonded. The assembly of touching surfaces then is placed under at least light pressure and cooled to ambient temperature to solidify and set the adhesive. The application temperature of the adhesive is set at a level such that adequate flow is obtained under the applied pressure to obtain a good bond between the surfaces to be bonded.

designated commercially as Macromelt 6901 (or Milvex 1200) and an alkenyl succinic anhydride in which R has an average value of about 37, designated commercially as Versar-300. At the same time, corresponding compositions were prepared, using a maleic acid modified polyethylene, a commercial product available under the trade name Epolene C-16. Antioxidants which are conventionally used in hot melt adhesives were also employed in the preparation of the compositions. These additives are identified as follows:

Cyanox 2246—hindered phenol
DLTDP—dilauryl thiodipropionate
Weston 618—organic phosphite The properties of the experimental compositions are shown in Table 1. Properties of corresponding compositions made with maleic anhydride modified polyethylene are also shown. It is clearly evident that these latter compositions do not possess the desirable low melt viscosity of the compositions of this invention. The property designated R&BSP is ring and ball softening point.

TABLE I

| | Macromelt 6901 (Milvex 1200)/VERSAR 300 Binary Blends | | | | | | |
|---|---|---|---|---|---|---|---|
| | Macromelt 6901 | Example 1 | | Example 2 | | Example 3 | |
| Composition (Parts by wt.) | | | | | | | |
| Macromelt 6901 (Milvex 1200) | 100 | 87.5 | 87.5 | 75.0 | 75.0 | 50.0 | 50.0 |
| VERSAR-300 | — | 12.5 | — | 25.0 | — | 50.0 | — |
| Epolene C-16 | — | — | 25.0 | — | 25.0 | — | 50.0 |
| Cyanox 2246 | — | 0.4 | 0.4 | 0.4 | 0.4 | 0.4 | 0.4 |
| DLTDP | — | 0.3 | 0.3 | 0.3 | 0.3 | 0.3 | 0.3 |
| Weston 618 | — | 0.3 | 0.3 | 0.3 | 0.3 | 0.3 | 0.3 |
| Properties | | | | | | | |
| R & BSP, °C. | 167 | 161 | 166 | 147 | 162 | 144 | 152 |
| Observation on Melt Clarity | transparent | transparent | opaque | transparent | cloudy | translucent | opaque |
| Melt Viscosity, cps | | | | | | | |
| @ 325° F. | — | — | — | — | — | 775 | N/A |
| @ 350° F. | — | 410,000 | — | 91,500 | 592,000 | 450 | N/A |
| @ 375° F. | — | 130,000 | — | 15,000 | 452,000 | 300 | N/A |
| @ 400° F. | 685,000 | 27,500 | 2,600,000 | 1,250 | 320,000 | 75 | N/A |
| @ 425° F. | 290,000 | — | 1,260,000 | — | — | — | N/A |
| @ 450° F. | 120,000 | — | 660,000 | — | — | — | N/A |
| Melt Viscosity Stability after 24 hours at 350° F. | | | | | | | |
| Viscosity at 350° F., cps | — | 5,500 | — | 512.5 | — | 50 | — |
| Observation | Skinning Gelled | Dark Color | Skinning Gelled | Dark Color | Skinning Gelled | Dark Color | Gelled |
| Mechanical Properties | | | | | | | |
| Tensile Strength | | | | | | | |
| @ Yield, psi | 885 | 992 | 950 | 940 | 925 | 850 | 600 |
| @ Break, psi | 3,350 | 2,485 | 2,770 | 2,150 | 925 | 1,050 | 600 |
| % Elongation | 450 | 365 | 375 | 380 | 35 | 310 | 20 |
| Performance | | | | | | | |
| Tensile Lap Shear Strength, psi Assembly:[1] | | | | | | | |
| Steel/Steel[1] | —[3] | 280(A)[2] | —[3] | 350(A)[2] | —[3] | 390(M)[2] | —[3] |
| ABS/ABS | —[3] | 125(A)[2] | —[3] | 110(A)[2] | —[3] | 140(A)[2] | —[3] |
| Nylon/Nylon | —[3] | Poor | —[3] | 80(A)[2] | —[3] | 175(A)[2] | —[3] |
| Wood/Wood | —[3] | >450(S)[2] | —[3] | >450(S)[2] | 350(C) | >500(S)[2] | —[3] |

[1]Steel pretreated with chromic acid 180° F., 15 min.
[2]Adhesive application temperature 400° F.
[3]Poor adhesion exhibited by beads applied at 400° F. and 450° F.
Failure mode of the assemblies
(A)Adhesion failure
(C)Cohesive failure in the adhesive
(S)Substrate failure
(M)Mixed mode of failure-adhesion & Cohesion The following examples are set forth to illustrate more clearly the principles and practice of the invention. Where parts and percentages are set forth, they are on a weight basis unless otherwise noted.

EXAMPLES 1-3

Three hot melt adhesive compositions were prepared, using a high molecular weight range polyamide,

EXAMPLES 4-6

Three hot melt adhesive compositions were prepared in the same manner as Examples 1-3, using a medium molecular weight range polyamide designated commercially as Versalon 1138. The corresponding compositions made with maleic anhydride-modified polyethylene were also prepared and evaluated and their properties are presented for comparative purposes along with those of Examples 4-6 in Table II. A commercial alkylated diphenylamine antioxidant was employed in all of the experimental compositions.

TABLE II

| Reference | Versalon 1138 | Versalon 1138/VERSAR Binary Blends | | | | | |
|---|---|---|---|---|---|---|---|
| | | Example 4 | | Example 5 | | Example 6 | |
| Composition (Parts by wt.) | | | | | | | |
| Versalon 1138 | 100 | 87.5 | 87.5 | 75.0 | 75.0 | 50.0 | 50.0 |
| VERSAR - 300 | — | 12.5 | — | 25.0 | — | 50.0 | — |
| Epolene C-16 | — | — | 12.5 | — | 25.0 | — | 50.0 |
| Naugard 445 (alkylated diphenylamine) | — | 0.5 | 0.5 | 0.5 | 0.5 | 0.5 | 0.5 |
| Properties | | | | | | | |
| R & BSP, °C. | 146 | 137 | 137 | 128 | 142 | 90 | 108 |
| Observation on melt Thermosel | transparent | transparent | opaque | transparent | opaque | transparent | opaque |
| Melt Viscosity, cps | | | | | | | |
| @ 325° F. | 21,000 | 7,875 | 42,500 | 3,000 | 104,000 | 730 | 87,000 |
| @ 350° F. | 9,875 | 2,100 | 22,750 | 900 | 56,000 | 190 | 71,000 |
| @ 375° F. | 4,875 | 725 | 11,750 | 450 | 31,500 | 60 | 62,000 |
| @ 400° F. | 2,500 | 375 | 6,000 | 125 | 16,500 | 30 | 52,000 |
| Melt Viscosity After 24 hours at 350° F. | | | | | | | |
| cps at 350° F. | 13,750 | 700 | 22,500 | 220 | 48,000 | 1,100 | 106,000 |
| Observation | some separation, color darkening | color darkening | total separation clouding | color darkening | total separation, clouding | color darkening | total separation clouding |
| Mechanical Properties | | | | | | | |
| Tensile Strength | | | | | | | |
| @ yield, psi | 465 | 481 | 547 | 444 | 577 | 572 | 738 |
| @ break, psi | 614 | 483 | 658 | 376 | 640 | 410 | 738 |
| % Elongation | 552 | 342 | 373 | 255 | 353 | 162 | 61 |
| Performance | | | | | | | |
| Tensile Lap Shear Strength psi Assembly: | | | | | | | |
| Steel/Steel[1] | 275[2](A) | 560[2](A) | 430[2](A) | 630[2](A) | 400[2](A) | 625[2](A) | 75[2](A) |
| | 490[3](A) | 540[3](A) | 380[3](A) | — | — | — | — |
| ABS/ABS | 285[2](A) | 440[2](A) | 450[2](S) | 395[2](S) | 300[2](A) | 210[2](A) | 245[2](A) |
| | 450[3](S) | 445[3](A) | 450[3](S) | — | — | — | — |
| Nylon/Nylon | 170[2](A) | 360[2](A) | 295[2](A) | 380[2](A) | 180[2](A) | 175[2](A) | 0 |
| | 290[3](A) | 280[3](A) | 265[3](A) | — | — | — | — |
| PVC/PVC | 325[2](A) | 275[2](A) | 385[2](A) | 190[2](A) | 375[2](A) | 175[2](A) | 0 |
| | 910[3](S) | 550[3](A) | 760[3](C) | — | — | — | — |

[1]Steel pretreated with chromic acid, 180° F. 15 minutes.
[2]Adhesive application temperature - 350° F.
[3]Adhesive application temperature - 400° F.
Failure mode of the assemblies
(A)Adhesion failure
(C)Cohesive failure in the adhesive
(S)Substrate failure In the examples described above it will be seen that the melt viscosity of thermoplastic polyamide adhesives is reduced substantially by only 12.5 percent by weight of alkenyl succinic anhydride, usually by a factor of several times. In some instances an alkenyl succinic anhydride content of only 2 weight percent is sufficient to obtain melt viscosity which will permit use in ordinary equipment. However, melt viscosity is lowered tremendously at contents of 25 to 60 weight percent, often with better average adhesion to a variety of substrates and with relatively minor reduction of bond strength. Where temperature resistance of the laminated structure is not a consideration, the compositions containing about 50 weight percent alkenyl succinic anhydride are preferred, as they may be applied at lower temperatures with ordinary equipment and at a very fast application rate.

What is claimed:

1. A hot melt adhesive composition consisting essentially of:

(a) 40-98 weight percent of a thermoplastic polyamide resin derived from dimer acid and a low molecular weight aliphatic diamine, and
    (b) 2-60 weight percent of an alkenyl succinic anhydride; said alkenyl succinic anhydride having the structure:

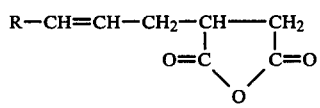

where R is an alkyl group containing about 15-49 carbon atoms; said polyamide resin having a molecular weight in the range of about 2,000 to 20,000 and a Ring and Ball softening point in the range of about 85° C. to 200° C.

2. A composition of claim 1 containing from 50 to 95 weight percent of a thermoplastic polyamide resin and from 5 to 50 weight percent of an alkenyl succinic anhydride.

3. A composition of claim 1 containing about 50-87.5 weight percent of a thermoplastic polyamide and about 12.5-50 weight percent of alkenyl succinic anhydride.

4. A composition of claim 1 containing about 50-75 weight percent of a thermoplastic polyamide and 25-50 weight percent of an alkenyl succinic anhydride.

5. A composition of claim 1 containing about 50 weight percent of a thermoplastic polyamide and about 50 weight percent of an alkenyl succinic anhydride.

* * * * *